з,173,513
LUBRICATING MEANS
Paul A. Haucke, Rahway, N.J., assignor to Buchanan Electrical Products Corporation, Hillside, N.J., a corporation of New Jersey
Filed Aug. 15, 1961, Ser. No. 131,589
2 Claims. (Cl. 184—105)

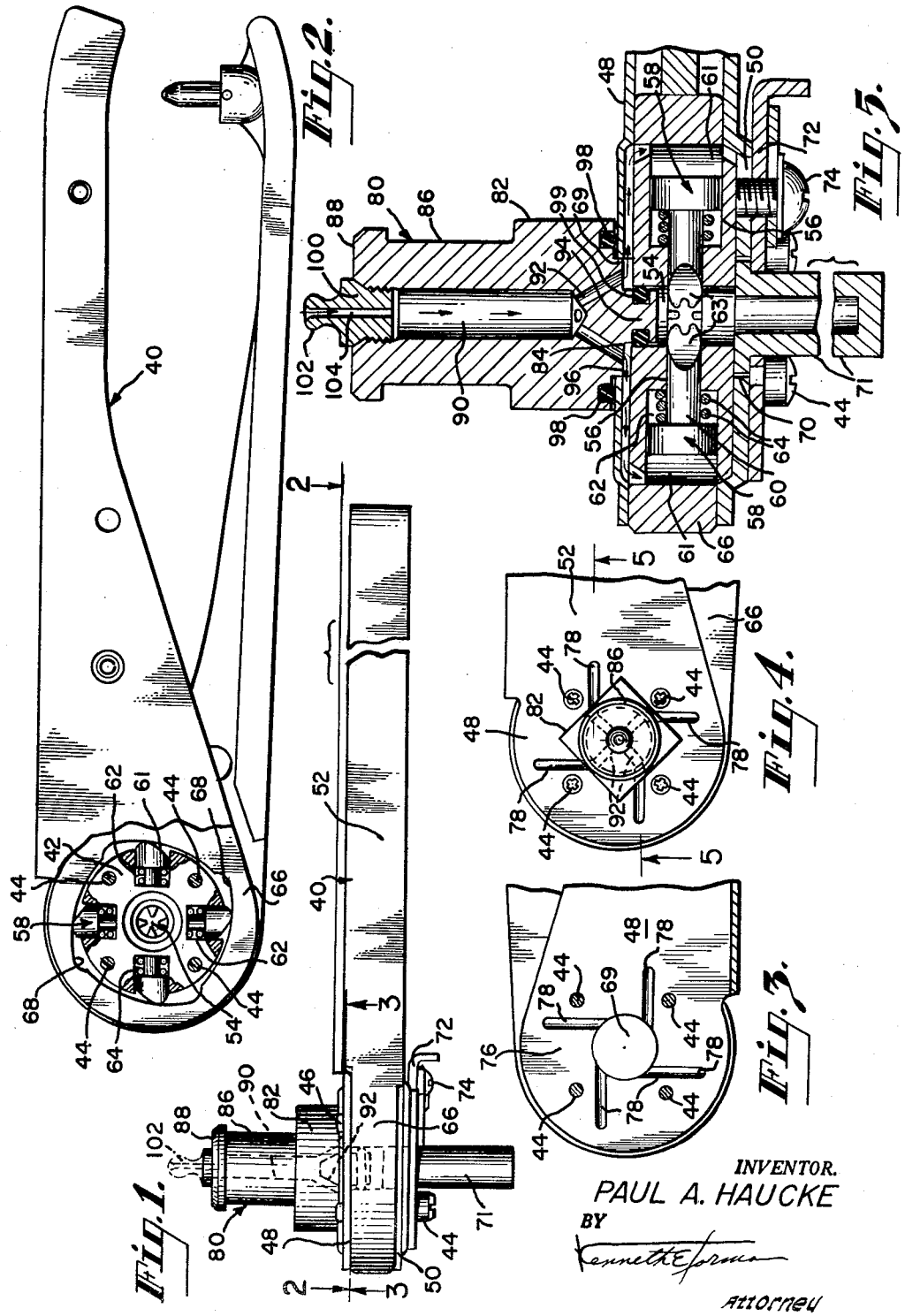

This invention relates to tools and more particularly to means for lubricating tools with enclosed movable mechanisms.

It is the usual practice when assembling tools with movable mechanisms to grease the parts in order to cut down on wear due to friction. However, after a period of time it becomes necessary to regrease these parts and it has heretofore been the practice to disassemble the tool in order to perform this function. This disassembly and reassembly operation is an expensive and time consuming procedure.

It is therefore the primary object of this invention to provide means for greasing the internal mechanisms of a tool without disassembling the tool.

It is another object of this invention to provide means for greasing a tool which will not interfere with the normal operation of the tool.

This invention may be briefly described as the combination of a tool having an enclosed movable mechanism, an opening communicating therewith and a grease fitting adapted to communicate with the opening such that grease received by the fitting will be conveyed through the opening to the internal movable mechanism of the tool and thereby grease the parts without dissembling the tool.

The novel features of this device, both as to its structure and method of operation, as well as additional objects and advantages thereof, will be understood more fully from the following description when read in connection with the accompanying drawings in which:

FIGURE 1 is a side elevational view of a tool with a grease fitting mounted thereon, FIGURE 2 is a view taken along the line 2—2 of FIGURE 1, FIGURE 3 is a view taken along the line 3—3 of FIGURE 1, FIGURE 4 is a plan sectional view showing a grease fitting mounted on the tool, and FIGURE 5 is a view taken along the line 5—5 of FIGURE 4.

Referring now to the drawings and more particularly to FIGS. 1, 2 and 5, there is shown by way of illustration, a manually operable crimping tool 40 which includes a generally disc-shaped die holder 42 rigidly secured, as by bolts 44 and nuts 46 to generally circularly shaped side portions 48 and 50 of a channel or U-shaped carrier member 52. The dieholder 42 is provided with a central circular shaped workpiece entry aperture 54 and a plurality (four in the illustrated embodiment) of radially disposed die member receiving bores 56 each having a crimping die or plunger member 58, reciprocably mounted therein.

The detailed construction of the die members is illustrated in FIGS. 2 and 5 and, as there shown, each die member 58 includes an elongated cylindrically shaped body portion 60 sized to be reciprocably contained in a bore 56 and an enlarged head portion or camming surface 61 which extends out past the outer periphery of the dieholder 42. The inner end of each of the body portions 60 extends into the entry aperture 54 and is formed with a pair of crimping teeth 63. As illustrated, each head portion or camming surface 61 is disposed in an enlarged peripheral recess 62 in the dieholder 42 and a biasing spring 64 is disposed within the recess and surrounding the body portion 60 for biasing the die member 58 radially outwardly.

Surrounding the die holder 42 and die members 58 mounted therein, and rotatably displaceable relative thereto, is a generally annular shaped camming member 66. A central opening in the member 66 is provided with a plurality of cam surfaces 68 engaging the outwardly biased head portion 61 of the individual die members 58. The rotative displacement of the camming member 66 relative to the carrier member 52 and the dieholder 42 rigidly mounted therein results, for one direction of rotation, in a simultaneous inward displacement of the individual die members 58, against the action of the individual biasing springs 64, and convergence of the crimping teeth 63 into the entry aperture 54. Rotation in the other direction permits outward displacement of the die members 58 by the biasing spring 64.

As best shown in FIGS. 3, 4, and 5, side portions 48 and 50 of carrier member 52 are provided with enlarged circular workpiece entry apertures 69 and 70, respectively, disposed in coaxial alignment with the workpiece entry aperture 54. Positioned in aperture 70 in side portion 50 is a locator 71 which is adapted to align a contact to be crimped in the workpiece entry aperture 54. The locator 71 is removably held in place by a latching member 72 which is secured to the tool by means of a plurality of bolts 74.

The inner surface 76 (see FIG. 3) of the carrier member's side portion 48 is stamped with a plurality of similar grooves 78 which extend from the circular entry aperture 69 radially outward toward the periphery of the carrier member 52. Each groove 78 is off centered from the axis of the aperture 69 so as to extend along the edge of the peripheral recesses 62 in the dieholder 42. The outer end of each groove 78 terminates over the space between the outer periphery of the dieholder 42 and the camming surfaces 68. The depth of the grooves 78 will depend on the viscosity of the grease to be used.

Referring now to FIGS. 1, 4 and 5, a grease fitting 80 is illustrated which comprises a square shaped base 82 having a stepped bottom surface 84 and a circular upper portion 86 which has a flat top surface 88. A large central circular opening 90 extends from the top surface 88 to a point midway through the base portion 82. Four equi-spaced openings 92, which are of smaller cross section than opening 90, extend from opening 90 to the bottom surface 84.

As best seen in FIG. 5, bottom surface 84 is formed with a projection 94 which is circular and adapted to extend into the workpiece entry aperture 54 and a second circular projection 96, of greater cross section, which is adapted to be positioned in aperture 69 in the carrier member's side portion 48. A pair of O-rings 98 and 99, positioned in appropriate grooves, engage the surface of the side portion 48 and the periphery of the entry aperture 54, respectively, thereby confining the grease to areas adjacent the grooves 78. It will be apparent that the bottom surface 84 can be formed in a number of different configurations to conform to the openings in different types of tools.

A nipple 100 is threaded into opening 90 from the top surface 88 with a circular head 102 extending above the surface and adapted to be engaged by a grease gun. An opening 104 through the nipple allows grease to flow from a grease gun to the opening 90.

As illustrated in FIGS. 1, 4 and 5, the grease fitting 80 is positioned on the carrier member's side portion 48 with the corners of the square shaped base portion 82 being positioned between the heads of bolts 44. This seating arrangement prevents the grease fitting 80 from turning during use. The fitting's bottom surface 84 engages the tool such that the circular projection 94 extends into the workpiece entry aperture 54 and the circular projection 96 into the aperture 69. As seen in FIG. 4, the openings 92 are positioned in alignment with the grooves 78 and as heretofore mentioned, the engagement of the sides of the base portion 82 prevents the openings and grooves from being rotated out of alignment. When pressure is placed on the upper end of the grease fitting 80, O-ring 98 is pressed against the surface of carrier member 52 and with O-ring 99 engaging the periphery of the workpiece entry-aperture 54 prevents grease from leaking out over the outside of the tool or into the entry aperture 54.

In operation, the grease fitting 80 is placed on the tool as heretofore described. A grease gun (not shown) is then placed in engagement with the nipple 100 and grease is forced under pressure into opening 90; through openings 92; along grooves 78; and into recesses 62 and the area between the outer periphery of the dieholder and the camming surfaces 68. When sufficient grease is forced into the areas surrounding the internal mechanisms, the gun and grease fitting 80 are removed and the tool is again ready for use.

From the foregoing description it will be apparent that I have provided a new combination of elements for greasing the internal mechanisms of a tool. While I have illustrated and described a particular tool and grease fitting, it will, no doubt, be apparent to those skilled in the art that various changes may be made in the particular devices disclosed and that other forms are possible, all within the spirit of the invention. For example, the crimping tool illustrated could be a tool for performing a different funciton with a different type of internal mechanism. Hence, I desire that the foregoing be taken merely as illustrative and not in a limiting sense.

What is claimed is:

1. The combination of a tool comprising a dieholder having a workpiece entry aperture therethrough, a plurality of dies mounted in said dieholder, an operating member engaging said dies and being capable of rotation with respect to said dieholder, a handle member enclosing said dieholder and dies, a plurality of openings communicating with said aperture and said enclosed dies, and a removable grease fitting comprising a body portion having an opening therethrough, a nipple positioned in one end of said opening for engaging a grease gun, the other end of said body portion having a configuration for positioning in said aperture with a plurality of openings aligned with the openings in said tool so that grease may be conveyed through said fitting and tool to said enclosed dies.

2. The combination of a tool comprising a dieholder having a workpiece entry aperture therethrough, a plurality of dies mounted in said dieholder, an operating member engaging said dies and being capable of rotation with respect to said dieholder, a carrier member attached to said die holder and enclosing said dies and having a plurality of grooves therein communicating with said aperture and said enclosed dies, and a removable grease fitting comprising a body portion having an opening therethrough, a nipple positioned in one end of said opening for engaging a grease gun, the other end of said body portion having a protrusion of the same configuration as said workpiece entry aperture, said protrusion also having a plurality of openings aligned with said grooves so that grease may be transmitted through said grease fittings and grooves to said enclosed dies.

References Cited in the file of this patent

UNITED STATES PATENTS

| | | |
|---|---|---|
| 1,857,048 | Hickok | May 3, 1932 |
| 2,237,484 | Gourley | Apr. 8, 1941 |
| 2,351,909 | Beretish et al. | June 20, 1944 |
| 2,438,128 | Poyner | Mar. 23, 1948 |
| 2,515,611 | Preszler | July 18, 1950 |
| 2,582,067 | Reeves | Jan. 8, 1952 |
| 2,727,416 | Labuza | Dec. 20, 1955 |
| 2,933,000 | Wood | Apr. 19, 1960 |